US012409354B2

(12) United States Patent
Polan

(10) Patent No.: US 12,409,354 B2
(45) Date of Patent: *Sep. 9, 2025

(54) ARRANGEMENT OF EXTENDED COVERAGE DRY PENDENT STORAGE SPRINKLERS FOR A STORAGE FREEZER

(71) Applicant: The Reliable Automatic Sprinkler Co. Inc., Liberty, SC (US)

(72) Inventor: George S. Polan, Liberty, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,463

(22) Filed: Jun. 14, 2024

(65) Prior Publication Data

US 2024/0325805 A1 Oct. 3, 2024

Related U.S. Application Data

(63) Continuation of application No. 17/555,632, filed on Dec. 20, 2021, now Pat. No. 12,064,656, which is a (Continued)

(51) Int. Cl.

*A62C 35/62* (2006.01)
*A62C 3/00* (2006.01)
*A62C 37/12* (2006.01)

(52) U.S. Cl.

CPC .............. *A62C 35/62* (2013.01); *A62C 3/004* (2013.01); *A62C 37/12* (2013.01)

(58) Field of Classification Search

CPC ........ A62C 3/004; A62C 35/62; A62C 35/645; A62C 35/68; A62C 37/12; A62C 37/14

See application file for complete search history.

(56) References Cited

U.S. PATENT DOCUMENTS 1,903,150 A 3/1933 Tyden
2,211,399 A * 8/1940 Winslow ................ A62C 37/09 169/39

(Continued)

FOREIGN PATENT DOCUMENTS

CA 2899173 A1 8/2014
KR 2011-0114985 A 10/2011

OTHER PUBLICATIONS

Australian Office Action mailed Jul. 24, 2020, issued in corresponding Australian Patent Application No. 2019213439.

(Continued)

*Primary Examiner* — Darren W Gorman
(74) *Attorney, Agent, or Firm* — Venable LLP

(57) ABSTRACT

A dry sprinkler has a casing tube having an inlet orifice and an outlet orifice. When the sprinkler is in a non-actuated state, an inlet seal assembly operatively seals the inlet orifice and an outlet seat assembly operatively seals the outlet orifice. A translating member extends through the casing tube between an inlet and an outlet. The translating member axially translates from a first position, in which the translating member retains the inlet seal assembly in a sealed state, to a second position, in which the translating member releases the inlet seal assembly, toward the outlet when the outlet seat assembly is released. The sprinkler has a nominal K-factor greater than 17 gpm/(psi)$^{1/2}$. A difference between a cross-sectional area of the casing tube and a cross-sectional area bounded by an outer perimeter of the translating member is more than 30% of the cross-sectional area of the casing tube.

18 Claims, 8 Drawing Sheets

Related U.S. Application Data continuation of application No. 15/775,683, filed as application No. PCT/US2016/061800 on Nov. 14, 2016, now Pat. No. 11,241,598.

(60) Provisional application No. 62/254,128, filed on Nov. 11, 2015.

(56) References Cited

U.S. PATENT DOCUMENTS

| | | | | |
|---|---|---|---|---|
| 4,177,862 | A | 12/1979 | Bray | |
| 5,415,239 | A | 5/1995 | Kotter | |
| 5,775,431 | A | 7/1998 | Ondracek | |
| 7,516,800 | B1 | 4/2009 | Silva, Jr. et al. | |
| 7,766,252 | B2 | 8/2010 | Jackson et al. | |
| 8,636,075 | B2 | 1/2014 | Franson | |
| 2006/0113094 | A1 * | 6/2006 | Silva, Jr. ................ | A62C 35/62 169/17 |
| 2010/0132962 | A1 | 6/2010 | Silva, Jr. et al. | |
| 2012/0132444 | A1 | 5/2012 | Buzdum et al. | |
| 2012/0298383 | A1 | 11/2012 | Shipman | |
| 2013/0037281 | A1 | 2/2013 | Szentimrey et al. | |
| 2013/0319696 | A1 | 12/2013 | Polan | |
| 2013/0319697 | A1 | 12/2013 | Pahila et al. | |
| 2015/0075821 | A1 | 3/2015 | Bucher | |
| 2015/0122513 | A1 | 5/2015 | Miller | |
| 2015/0375024 | A1 | 12/2015 | Kadoche | |
| 2016/0339283 | A1 | 11/2016 | Ringer et al. | |

OTHER PUBLICATIONS

Notification of Transmittal of the International Search Report and the Written Opinion of the International Searching Authority, or the Declaration, the International Search Report and the Written Opinion dated Jan. 23, 2017, issued in corresponding International Patent Application No. PCT/US2016/061800.

International Preliminary Report on Patentability, dated Jan. 17, 2018, issued in corresponding International Patent Application No. PCT/US2016/061800.

* cited by examiner

ARRANGEMENT OF EXTENDED COVERAGE DRY PENDENT STORAGE SPRINKLERS FOR A STORAGE FREEZER

CLAIM OF PRIORITY

This application is a continuation of U.S. patent application Ser. No. 17/555,632, filed Dec. 20, 2021, now U.S. Pat. No. 12,064,656, issued Aug. 20, 2024, which is a continuation of U.S. patent application Ser. No. 15/775,683, filed Oct. 29, 2019, now U.S. Pat. No. 11,241,598, issued Feb. 8, 2022, which is a U.S. national stage application of International Application No. PCT/US2016/061800, filed Nov. 14, 2016, which claims priority from U.S. Provisional Application No. 62/254,128, filed Nov. 11, 2015.

FIELD OF THE INVENTION

This invention relates generally to fire prevention sprinklers, and more particularly to dry sprinklers.

Fire prevention sprinklers of the type known as dry sprinklers are used in areas that are exposed to freezing conditions, such as in freezers or unconditioned areas in and around buildings that may experience freezing conditions. In some sprinkler systems using dry sprinklers, supply conduits configured to supply a fluid are provided in a space that is not subject to freezing. A dry sprinkler is attached to the supply conduit and extends into a space that is subject to freezing.

FIG. 1 shows a conventional dry sprinkler in a non-actuated state, and FIG. 2 shows the same dry sprinkler in an actuated state. As shown in FIGS. 1 and 2, this conventional dry sprinkler includes an outer casing tube 1, an inner tube 2 located inside the outer casing tube 1 and having a proximal opening 4, an intermediate opening 6, a distal opening 7, and a sprinkler deflector 11 at a distal end. The conventional dry sprinkler also has an inlet fitting 3 for connecting to a supply conduit (not shown), and a sealing washer 5, positioned in a seat in the inlet fitting 3, for creating a seal between the dry sprinkler and the supply conduit when the dry sprinkler is in an unactuated state. Moreover, the conventional dry sprinkler typically includes, at its distal end, an operating element, including an orifice adapter 8, a plug 9, and a temperature-sensitive element 10.

During actuation of the conventional dry sprinkler, the operating element responds to a high-temperature condition sufficient to fracture the temperature-sensitive element 10, releasing the temperature-sensitive element 10 from the sprinkler, permitting the plug 9 to be expelled from the sprinkler and the distal end of the inner tube 2 to move toward the sprinkler deflector 11. Movement of the inner tube 2 towards the sprinkler deflector 11 releases the sealing washer 5 from the seat, allowing the fluid in the supply conduit to pass through the sprinkler for delivery to the space being protected by the sprinkler. The fluid flows primarily, if not totally, into the proximal opening 4, through the inner tube 2, and is discharged through the distal opening 7 and the orifice adapter 8, striking the sprinkler deflector 11. The sprinkler deflector 11 directs the fluid onto the space protected by the sprinkler in a predetermined pattern.

Since the fluid flows through the inner tube 2 in the conventional dry sprinkler, the inner tube 2 in conventional dry sprinklers typically has an outer diameter that is only slightly smaller than the inner diameter of the outer casing tube 1. For example, conventional dry sprinklers are known that have an inner tube 2 with an outer diameter that is only approximately 0.2 inch (0.5 cm) smaller than the inner diameter of the outer casing tube 1, so there is a small 0.1 inch (0.25 cm) gap, on average, between the inner tube 2 and the outer casing tube 1. FIG. 1A shows a cross-sectional illustration of the outer casing tube 1 and the inner tube 2 of the sprinkler shown in FIG. 1.

Also, in order to increase the flow rate of the fluid through the sprinkler at a certain supply pressure, it is typically necessary to increase the diameter of the inner tube 2 and, therefore, to increase the size of the whole sprinkler. When dry sprinklers are used to protect storage spaces, the flow rates required are relatively large as compared with the flow rates required to protect light hazard and ordinary hazard occupancies. The large flow rates required to protect storage spaces also require a relatively heavier construction to permit the increased flow rates at typical supply pressures. The result of these requirements is a conventional sprinkler of heavy, expensive construction, and having large fittings at the inlet end to accommodate desired large flow rates as well as the mentioned elevated pressures. The inlet fitting 3, shown in FIG. 1, is an example of such a large fitting. Conventional dry sprinklers may also require special modifications in design at the distal (sprinkler deflector) end. In addition to these disadvantages, the resulting heavy sprinkler may also be difficult to install because of its bulkiness and weight.

For dry-type storage sprinklers having a K-factor (flow coefficient relating the flow rate through the sprinkler to the square root of the fluid pressure in the supply conduit) of more than 14 gpm/(psi)$^{1/2}$ (gpm/(psi)$^{1/2}$ being the largest K-factor for commercially available sprinklers), the inlet size (that is, the diameter of the orifice closed by the inlet seal assembly) has been increased to obtain relatively larger K-factors. As the inlet is made larger, however, the force that the operating element must withstand increases for the same fluid pressure in the supply conduit. As the size of the inlet orifice increases, the area of the sealing washer exposed to the fluid in the supply conduit also increases. The force on the sealing washer is the product of the pressure of fluid in the supply conduit and the area of the sealing washer exposed to fluid in the supply conduit. To maintain the sealing washer in the seat in the inlet without leaking or rupture of the sprinkler, the force on the sealing washer from the operating element must be at least equal to the force on the sealing washer from the fluid in the supply conduit. United States Underwriter's Laboratories (UL) Standard 199, Standard for Safety for Automatic Sprinklers for Fire-Protection Service, Eleventh Edition, and UL Standard 1767, Standard for Safety for Early-Suppression Fast-Response Sprinklers, Fourth Edition, both require that sprinklers withstand a pressure of 500 psig (3447.4 kPs) in the supply conduit without leaking of the sprinkler, and a pressure of 700 psig (4826.3 kPa) in the supply conduit without rupture of the sprinkler. As an example, exposing a sealing washer having a 1-inch (2.54-cm) diameter to a pressure of 700 psig (4826.3 kPa) would require the operating element to withstand a force exceeding 549 pounds (249 kg), while exposing a sealing washer having a 1¼-inch (3.175 cm) diameter to the same 700 psig (4826.3 kPa) pressure would require the operating element to withstand a force of more than 858 pounds (389 kg). Stronger operating elements are required to resist the force produced as a result of using a larger inlet orifice and a larger sealing washer. However, increasing the strength of the operating element by increasing the size and mass of the operating element reduces the sensitivity of the operating element to changes in temperature that cause operation of the sprinkler, thereby delaying sprinkler operation.

As a result, these conventional dry sprinklers typically have a maximum K-factor of 16.8 gpm/(psi)$^{1/2}$. And, even with a large and heavy sprinkler, it is conventionally only possible to use such a sprinkler in a sprinkler system with a maximum spacing of 10 feet (3.05 m) between sprinklers, for a maximum area protected of 100 square feet (9.29 square meters) per sprinkler.

SUMMARY

To address the problems described above, a dry sprinkler is provided having a translating member connecting an operating element and a sealing washer, constructed such that fluid, such as water, flows around the translating member and between the translating member and a casing tube, utilizing a cross-sectional area of the casing tube, instead of being limited to flow through an inner tube.

A dry sprinkler is provided having a casing tube having an inlet at a first end, the inlet defining an inlet orifice, and an outlet at a second end, the outlet defining an outlet orifice. An inlet seal assembly is configured to operatively seal the inlet orifice when the sprinkler is in a non-actuated state, and an outlet seat assembly is configured to operatively seal the outlet orifice when the sprinkler is in the non-actuated state. In addition, a translating member extends between the inlet and the outlet through the casing tube, and (i) supports the inlet seal assembly to seal the inlet orifice, (ii) is supported by the outlet seat assembly, and (iii) is configured to axially translate from a first position, in which the translating member is supported by the outlet seat assembly and retains the inlet seal assembly in a sealed state, to a second position, in which the translating member is not supported by the outlet seat assembly and releases the inlet seal assembly, toward the outlet when the outlet seat assembly is released. The dry sprinkler has a nominal K-factor greater than 17 gpm/(psi)$^{1/2}$. In addition, a difference between a cross-sectional area of the casing tube and a cross-sectional area bounded by an outer perimeter of the translating member is more than 30% of the cross-sectional area of the casing tube.

In one embodiment, the translating member is a tube. In another embodiment, the translating member is a solid rod. In another embodiment, a cross-sectional shape of the translating member is a polygon. In yet another embodiment, a cross-sectional shape of the translating member is a cross. According to another embodiment, the nominal K-factor is equal to or greater than 22.4 gpm/(psi)$^{1/2}$.

In another embodiment, a dry sprinkler comprises a casing tube having an inlet at a first end, the inlet defining an inlet orifice, and an outlet at a second end, the outlet defining an outlet orifice. An inlet seal assembly is configured to operatively seal the inlet orifice when the sprinkler is in a non-actuated state, and an outlet seat assembly configured to operatively seal the outlet orifice when the sprinkler is in the non-actuated state. In addition, a translating member extends between the inlet and the outlet through the casing tube, and (i) supports the inlet seal assembly to seal the inlet orifice, (ii) is supported by the outlet seat assembly, and (iii) is configured to axially translate from a first position, in which the translating member is supported by the outlet seat assembly and retains the inlet seal assembly in a sealed state, to a second position, in which the translating member is not supported by the outlet seat assembly and releases the inlet seal assembly, toward the outlet when the outlet seat assembly is released. In this embodiment, the dry sprinkler is an extended coverage dry pendent storage sprinkler having a coverage area of greater than 10.22 square meters (110 square feet).

According to another embodiment, the coverage area is at least 13.38 square meters (144 square feet). According to yet another embodiment, the coverage area is at least 18.209 square meters (196 square feet).

In another embodiment, a dry sprinkler comprises a casing tube having an inlet at a first end, the inlet defining an inlet orifice, and an outlet at a second end, the outlet defining an outlet orifice. An inlet seal assembly is configured to operatively seal the inlet orifice when the sprinkler is in a non-actuated state, and an outlet seat assembly configured to operatively seal the outlet orifice when the sprinkler is in the non-actuated state. A translating member extends between the inlet and the outlet through the casing tube, and (i) supports the inlet seal assembly to seal the inlet orifice, (ii) is supported by the outlet seat assembly, and (iii) is configured to axially translate from a first position, in which the translating member is supported by the outlet seat assembly and retains the inlet seal assembly in a sealed state, to a second position, in which the translating member is not supported by the outlet seat assembly and releases the inlet seal assembly, toward the outlet when the outlet seat assembly is released, wherein the translating member has a cross-sectional area that occupies at least 2% of, and not more than 65% of, an internal cross-sectional area of the casing tube. In addition, the inlet orifice and the outlet orifice communicate with a volume interior of the casing tube and exterior of the translating member.

In one embodiment, the casing tube has an average outer diameter of at least 38.1 mm (1.5 inches). In another, embodiment, the casing tube has an average outer diameter of 38.1 to 63.5 mm (1.5 to 2.5 in.). In yet another embodiment, the casing tube has an average inner diameter that is at least 5.08 mm (0.2 in.) greater than an average outer diameter of the translating member.

In another embodiment, a dry sprinkler comprises a casing tube having an inlet at a first end, the inlet defining an inlet orifice and having a central axis, and an outlet at a second end, the outlet defining an outlet orifice. An inlet seal assembly is configured to seal the inlet orifice, and comprises a body having an asymmetric cap portion including a first portion on one side of a plane that contains the central axis of the inlet, and a second portion on an opposite side of the plane, wherein, with respect to a second axis that passes through and is normal to the central axis of the inlet, the first portion has a greater moment of inertia than the second portion, and a sealing washer provided on the body, the sealing washer being urged against the inlet when the sprinkler is in a non-actuated state, and urging the inlet seal assembly away from the inlet upon actuation of the sprinkler. The dry sprinkler also comprises an outlet seat assembly configured to operatively seal the outlet when the sprinkler is in the non-actuated state. A translating member extends between the inlet and the outlet through the casing tube, and (i) supports the inlet seal assembly to seal the inlet orifice, (ii) is supported by the outlet seat assembly, and (iii) is configured to axially translate from a first position, in which the translating member is supported by the outlet seat assembly and retains the inlet seal assembly in a sealed state, to a second position, in which the translating member is not supported by the outlet seat assembly and releases the inlet seal assembly toward the outlet when the outlet seat assembly is released, wherein the dry sprinkler has a nominal K-factor greater than 16.8 gpm/(psi)$^{1/2}$.

In one embodiment, the first portion of the body of the inlet seal assembly has a greater mass than the second portion. In another embodiment, the body of the inlet seal assembly has a first generally planar surface supporting the sealing washer, and a second surface, the second surface being positioned at a first height from the first generally planar surface on a first side of the body relative to the central axis of the inlet, and positioned at a second height from the first generally planar surface on a second side of the body that is opposite to the first side of the body relative to the central axis of the inlet, the second height being less than the first height. In one embodiment, the second surface is generally planar and is inclined at an angle relative to the first generally planar surface. In another embodiment, the angle is greater than zero but less than 12.5°. In yet another embodiment, the angle is greater than about 15° but less than 25.5°.

In another embodiment, a dry sprinkler comprises a casing tube having an inlet at a first end, the inlet defining an inlet orifice, and a second end. An inlet seal assembly is configured to operatively seal the inlet orifice when the sprinkler is in a non-actuated state. A sprinkler head is connected to the second end of the casing tube, and comprises a deflector, and a frame supporting the deflector, and having a connector machined into the frame, the connector (i) securing the sprinkler head to the second end of the casing tube, and (ii) defining an outlet orifice facing the deflector to deliver liquid to the deflector upon actuation of the sprinkler. The dry sprinkler also comprises a translating member extending between the inlet and the outlet through the casing tube, the translating member (i) supporting the inlet seal assembly to seal the inlet orifice, and (ii) being configured to axially translate from a first position, in which the translating member retains the inlet seal assembly in a sealed state, to a second position, in which the translating member releases the inlet seal assembly. In addition, a support is provided adjacent to the outlet orifice along an axis that is perpendicular to a longitudinal axis of the translating member and supporting the translating member when the sprinkler is in the non-actuated state. The translating member is supported by the support in the first position and wherein the translating member is constructed to axially translate toward the outlet upon actuation of the sprinkler. In addition, the dry sprinkler has a nominal K-factor greater than 16.8 gpm/(psi)$^{1/2}$.

In another embodiment, a dry sprinkler comprises a casing tube having an inlet at a first end, the inlet defining an inlet orifice and having a central axis, and an outlet at a second end, the outlet defining an outlet orifice. An inlet seal assembly is configured to seal the inlet orifice, and has a body having an asymmetric cap portion including a first portion on one side of a plane that contains the central axis of the inlet, and a second portion on an opposite side of the plane, wherein, with respect to a second axis that passes through and is normal to the central axis of the inlet, the first portion has a greater moment of inertia than the second portion, and a sealing washer provided on the body, the sealing washer being urged against the inlet when the sprinkler is in a non-actuated state, and urging the inlet seal assembly away from the inlet upon actuation of the sprinkler. The dry sprinkler also comprises an outlet seat assembly configured to operatively seal the outlet when the sprinkler is in the non-actuated state. In addition, a translating member extends between the inlet and the outlet through the casing tube, and (i) supports the inlet seal assembly to seal the inlet orifice, (ii) is supported by the outlet seat assembly, and (iii) is configured to axially translate from a first position, in which the translating member is supported by the outlet seat assembly and retains the inlet seal assembly in a sealed state, to a second position, in which the translating member is not supported by the outlet seat assembly and releases the inlet seal assembly. A sprinkler head is secured to the second end of the casing tube, and comprises a deflector, and a frame supporting the deflector. In this embodiment, the sprinkler head is an extended coverage sprinkler head.

In yet another embodiment, a dry sprinkler comprises a casing tube having an inlet at a first end, the inlet defining an inlet orifice and having a central axis, and an outlet at a second end, the outlet defining an outlet orifice. An inlet seal assembly is configured to seal the inlet orifice, and comprises a body having an asymmetric cap portion including a first portion on one side of a plane that contains the central axis of the inlet, and a second portion on an opposite side of the plane, wherein, with respect to a second axis that passes through and is normal to the central axis of the inlet, the first portion has a greater moment of inertia than the second portion, and a sealing washer provided on the body, the sealing washer being urged against the inlet when the sprinkler is in a non-actuated state, and urging the inlet seal assembly away from the inlet upon actuation of the sprinkler. The dry sprinkler also comprises an outlet seat assembly configured to operatively seal the outlet when the sprinkler is in the non-actuated state. In addition, a translating member extends between the inlet and the outlet through the casing tube, and (i) supports the inlet seal assembly to seal the inlet orifice, (ii) is supported by the outlet seat assembly, and (iii) is configured to axially translate from a first position, in which the translating member is supported by the outlet seat assembly and retains the inlet seal assembly in a sealed state, to a second position, in which the translating member is not supported by the outlet seat assembly and releases the inlet seal assembly. In addition, a sprinkler head is secured to the second end of the casing tube, and comprises a deflector, and a frame supporting the deflector. In this embodiment, the casing tube has an average internal cross-sectional area of at least 1161.29 sq. mm (1.8 sq. in.).

Figure 1:
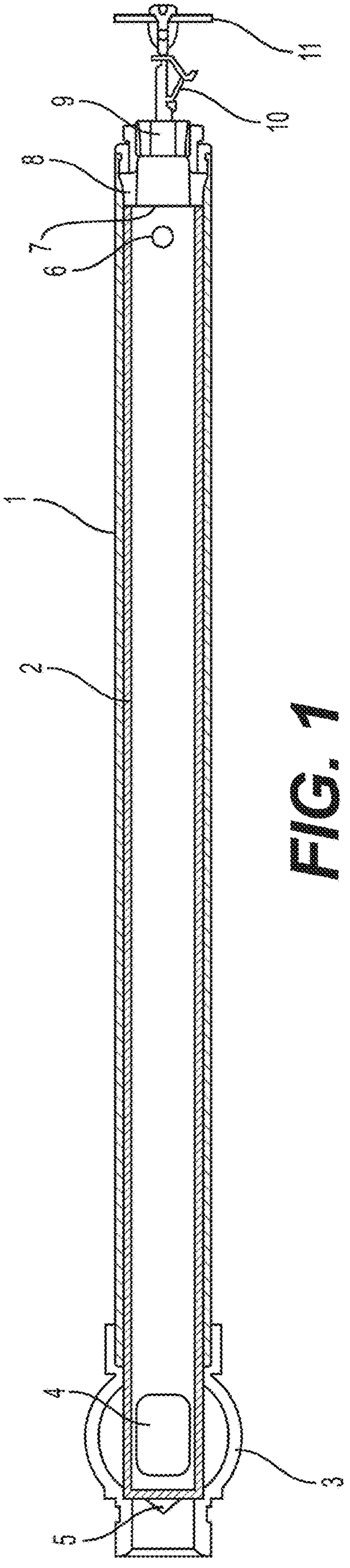
FIG. 1 PRIOR ART
FIG. 1 shows a conventional dry sprinkler in a non-actuated state.
Figure 1A:
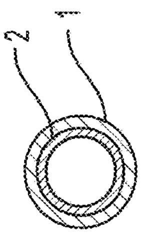
FIG. 1A PRIOR ART
FIG. 1A shows a cross-sectional detail.

Any reference numeral that appears in different figures represents the same element in those figures, even if that element is not described separately with respect to each figure.

DETAILED DESCRIPTION

Figure 3:
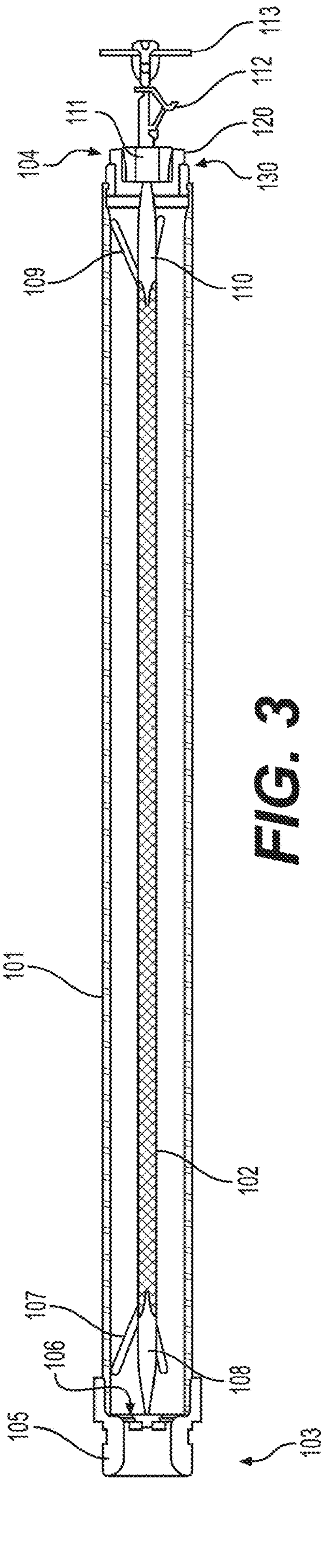
FIG. 3 shows a dry sprinkler in a non-actuated state, according to an embodiment described herein.
Figure 3A:
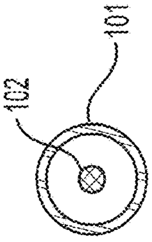
FIG. 3A is a cross-sectional detail.
Figure 4:
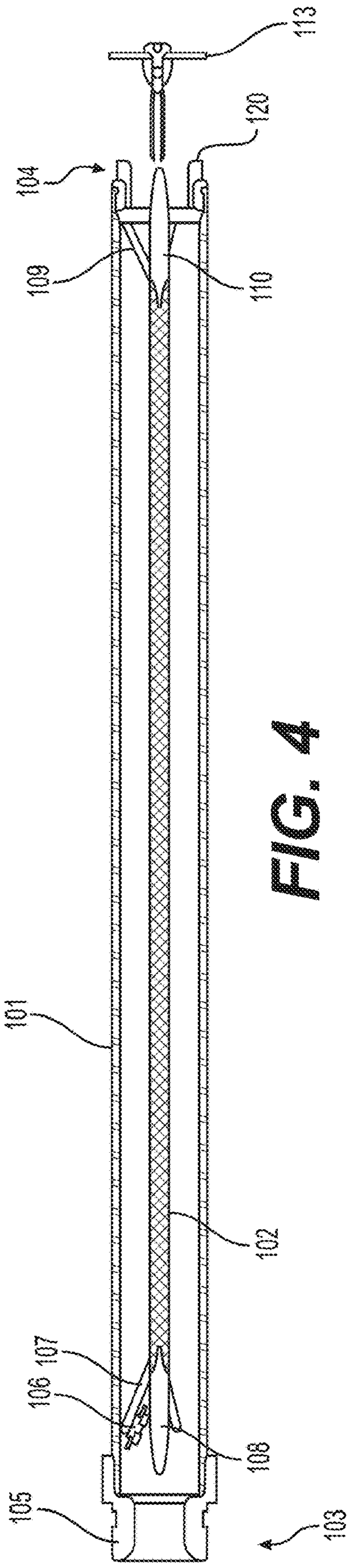
FIG. 4 shows the dry sprinkler shown in FIG. 3, in an actuated state, according to an embodiment described herein.
Figure 4A:
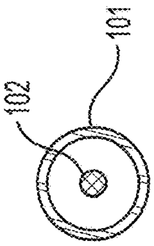
FIG. 4A shows a cross-sectional detail.

FIGS. 3 and 4 show an embodiment of a dry sprinkler in a non-actuated state and an actuated state, respectively. In this embodiment, the dry sprinkler is comprised of a casing tube 101 having a first end, or an inlet end 103 and a second end, or an outlet end 104. An inlet fitting 105 is secured to the first end 103 of the casing tube 101, for example, by a threaded connection, and is also secured to a supply conduit (not shown). The inlet fitting 105 defines an inlet orifice that is operatively sealed by an inlet seal assembly 106.

An outlet fitting 120 is attached to the second end 104 of the casing tube 101. The outlet fitting 120 defines an outlet orifice that is operatively sealed, as shown in FIG. 3, by an outlet seat assembly 130, including a plug 111.

A translating member 102 extends between the inlet orifice and the outlet orifice through the casing tube 101. Toward the first end 103, the translating member 102 has a yoke 107 and a proximal pin 108. In this embodiment, the yoke 107 is formed by several rods, for example, three rods, each having one end secured to the body of the translating member 102 and extending toward the inlet end 103 and outward from the translating member 102. In this embodiment, the other (outer) ends of the rods of yoke 107 are free. The proximal pin 108 extends axially (i.e., along an axis of the translating member 102), from the proximal end of the translating member 102 toward the inlet orifice, and in the unactuated state, shown in FIG. 3, the proximal pin 108 contacts an inlet seal assembly 106 and supports the inlet seal assembly 106 in place against a seat at the inlet orifice, thereby sealing the inlet orifice.

When the sprinkler is actuated, the translating member 102 is constructed to release the inlet seal assembly 106 by axially translating from a first position, in which the translating member 102 holds the inlet seal assembly 106 in the seat at the inlet orifice (e.g., FIG. 3), to a second position, removed from the first position, in which the translating member 102 allows the seal assembly 106 to move into the interior of the casing tube 101, as described below (e.g., FIG. 4), thereby opening the inlet orifice and allowing a fluid from the fluid conduit to flow through the sprinkler.

Near the second end 104 of the casing tube 101, a saddle 109 and a distal pin 110 are attached to the translating member 102. In the first position, the translating member 102 is supported by an outlet seat assembly 130 by the distal pin 110. The translating member 102 is constructed to translate into the second position by moving axially toward the outlet fitting 120 when the outlet seat assembly 130 is released upon activation of an operating or triggering element 112.

When the translating member 102 is in the second position, as shown in FIG. 4, the yoke 107 traps the released inlet seal assembly 106, so as to reduce any flow blockage created by the released inlet seal assembly 106, and so as to not block the outlet orifice. Also, when the translating member 102 is in the second position, the saddle 109 stops the motion of the translating member 102 while still allowing the fluid to flow from the area between the translating member 102 and the casing tube 101 to the outlet orifice in the distal (second) end of the sprinkler.

An inlet seal assembly that may be used in the embodiment has a body, and a sealing washer, such as a Belleville spring washer, seated on a portion of the body. Prior to actuation, the inlet seal assembly 106 closes the inlet orifice of the sprinkler, as shown in FIG. 3, and is pressed against a seating surface of the inlet fitting 105. In this position, the sealing washer is urged against the inlet orifice, in such manner as to apply an axial force urging the inlet seal assembly 106, maintaining a load on the inlet seal assembly 106 in the non-actuated state. The body may have a first planar surface (not illustrated) at its periphery, supporting the sealing washer. The first planar surface is secured to the rest of the body by means of a central plate or plug that may be integral with the first planar surface, and that is received in a bore and in a counter-bore provided for the upper part of the body of the inlet seal assembly 106. One example of the structure of the upper portion is shown in FIGS. 3B and 3C.

Figure 3C:
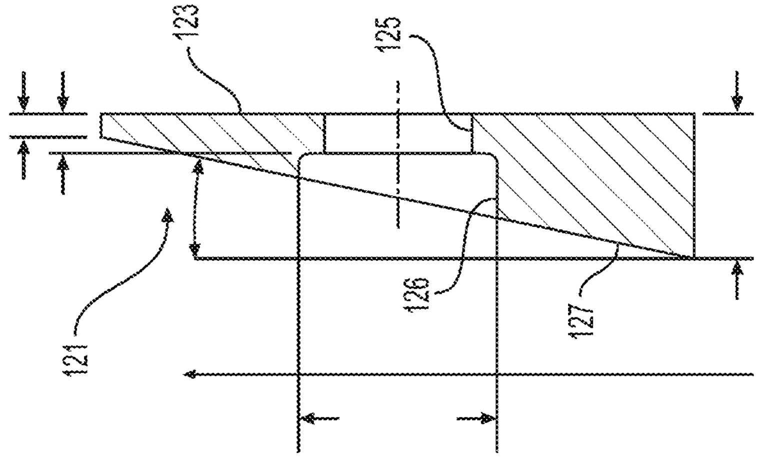
FIG. 3C shows a cross-sectional view of the element shown in FIG. 3B, taken along section 3B-3B.
Figure 3B:
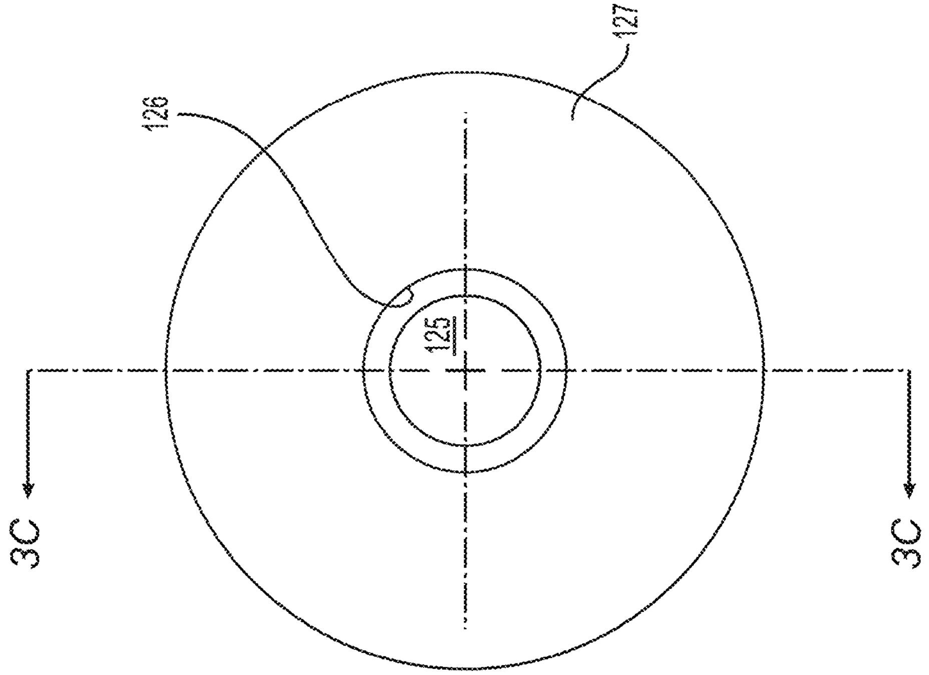
FIG. 3B shows a view of the dry sprinkler.

As shown in FIGS. 3B and 3C, the upper portion of the body of the inlet seal assembly 106 has a lower, planar surface, against which a lower part of the body rests, and a central bore 125 and counter-bore 126 that, as stated, receive the central plate of the lower part of the body. The first planar surface on which the sealing washer is provided extends radially outward of planar surface 123. The upper portion of a top part 121 of the seal assembly body has, in this embodiment, a planar surface 127 oriented at an angle to the lower surface 123. At a first side of the top part 121 (shown at the bottom of these Figures), a distance between the surfaces 127 and 123 is greater than a distance between the surfaces 127 and 123 at the opposite, second side of the top part 121 (at the top of FIGS. 3B and 3C). The top 121 is machined from a suitable material, such as brass, bronze, or stainless steel, and a relatively larger thickness of the first side of the top part 121 assists in causing the body of the inlet seal assembly 106 to rotate during sprinkler actuation, in such a manner as to allow the body to be captured by the yoke 107, as illustrated in FIG. 4. In some embodiments, the angle between the surfaces 123 and 127 may be over 2°, but not greater than 12°. In other embodiments, however, it may be larger, for example, greater than 12°, or greater than 14°, or larger.

In some embodiments, it is not necessary that the upper surface 127 is strictly (or even approximately) planar. Other structures may be used to provide asymmetry in mass distribution to promote the mentioned rotation of the body of the inlet seal assembly 106 upon actuation.

In one embodiment, the dry sprinkler has a nominal K-factor greater than 17 gpm/(psi)$^{1/2}$. In other embodiments, the nominal K-factor can be equal to or greater than 22.4 gpm/(psi)$^{1/2}$, and can be as high as 33.6 gpm/(psi)$^{1/2}$ or greater.

As shown in FIGS. 3 and 4, there is a substantial difference in cross-sectional area between the casing tube 101 and that occupied by the outer perimeter of the translating member 102. In this embodiment, the difference is 35% or more of the internal cross-sectional area of the casing tube 101. For example, in a case in which the casing tube 101 has a diameter of about 38.1 mm (1.5 inches), the translating member 102 may have a diameter of about 30.71 mm (1.209 inches) or less. The casing tube 101 may have an internal cross-sectional area of 1161.29 sq. mm (1.8 sq. in.) or more, while the translating member 102 has a cross-sectional area of 754.84 sq. mm (1.17 sq. in.) or less, as the configuration such that 35% or more of the internal cross-sectional area of the casing tube is outside of the translating member.

In the embodiment shown in FIGS. 3 and 4, the translating member 102 is in the shape of a solid rod.

Figure 5:
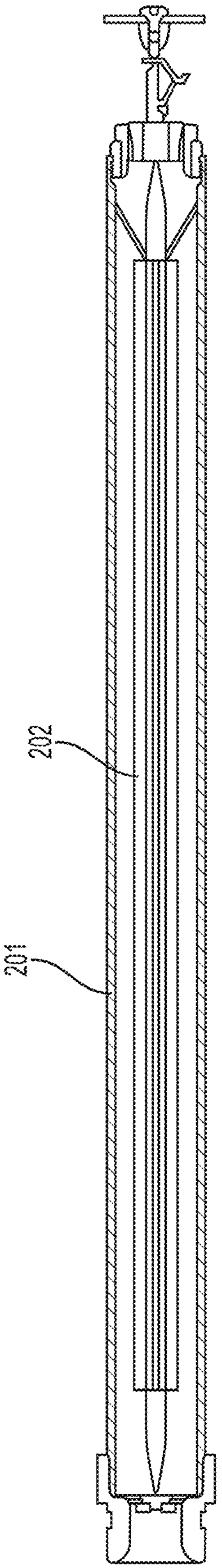
FIG. 5 shows a dry sprinkler according to another embodiment described herein.
Figure 5A:
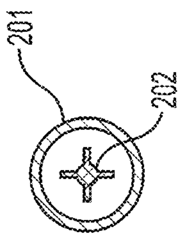
FIG. 5A shows a cross-sectional detail.
Figure 6:
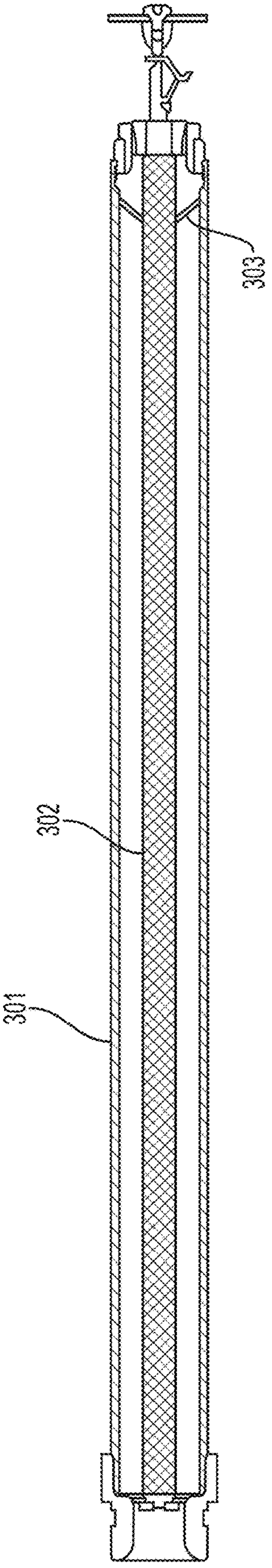
FIG. 6 shows a dry sprinkler according to an additional embodiment described herein.
Figure 6A:
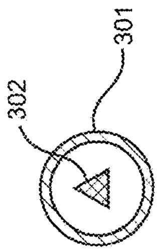
FIG. 6A shows a cross-sectional detail.

In other embodiments, the translating member has a cross section in the shape of a cross (e.g., translating member 202 inside casing tube 201, as shown in FIG. 5), or has a cross section in the shape of a triangle (e.g., translating member 302 inside of casing tube 301, as shown in FIG. 6). In these embodiments, the translating member 202, 302 is solid and the difference between a cross-sectional area of the casing tube 201, 301 and a cross-sectional area bounded by an outer perimeter of the translating member 202, 302 is more than 35% of the cross-sectional area of the casing tube 201, 301.

The shape of the translating member is selected to resist buckling under the compressive forces needed to prevent fluid entry into the dry sprinkler from the supply conduit in the non-actuated state, while providing a minimum resistance to fluid flow through the dry sprinkler in the actuated state. The shape of the translating member is based on the pressure on the fluid in the supply conduit, which influences the force on the inlet sealing assembly and the translating member, and the intended flow coefficient of the dry sprinkler, which influences the desired restriction of fluid flow through the dry sprinkler.

The embodiment illustrated in FIG. 4 includes a solid translating member 102 with a circular cross section designed for low resistance to fluid flow through the dry sprinkler following actuation. The embodiment in FIG. 5 includes a solid translating member 202 with a cross-sectional shape having a greater moment of inertia than the circular shape illustrated in FIG. 4, to better resist buckling of the translating member 202 prior to actuation. The embodiment shown in FIG. 6 illustrates a solid translating member 302 with a polygonal cross section (here, triangular) that may be used to provide flat surfaces for attachment of components, such as guide arms 303, to the translating member 302.

In the embodiments in which the translating member is a solid member, water flows from the first end to the second end of the dry sprinkler between the solid translating member and the casing tube. This can provide the advantageous effect of reducing the restriction as water flows through the sprinkler, and, as a result, the size of the inlet orifice can be minimized. Since the size of the inlet orifice determines the amount of force on the operating mechanism, by minimizing the size of the inlet orifice, it is also possible to minimize forces on the operating mechanism.

In some embodiments, the operating mechanism includes an extended coverage storage sprinkler head (e.g., sprinkler head 113 of FIGS. 3 and 4). In these embodiments, the extended coverage sprinkler has a maximum spacing exceeding 9.29 square meters (100 square feet) per sprinkler and up to 18.209 square meters (196 square feet) per sprinkler. For example, the dry sprinkler can be an extended coverage dry pendent storage sprinkler having a coverage area of greater than 10.22 square meters (110 square feet). In other examples, the coverage area is at least 13.38 square meters (144 square feet). And, in other examples, the coverage area is at least 18.209 square meters (196 square feet).

Figure 7:
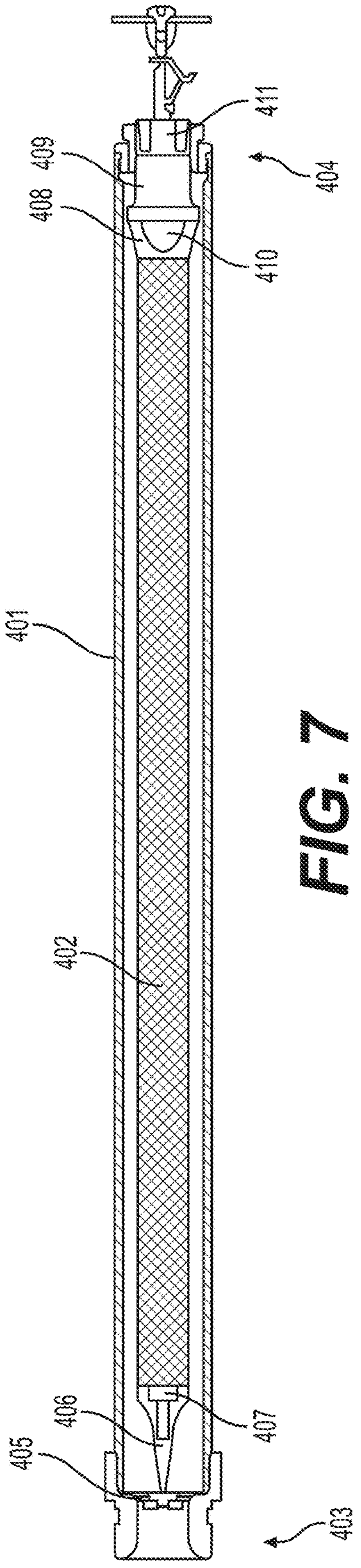
FIG. 7 shows a dry sprinkler according to yet another embodiment described herein.
Figure 7A:
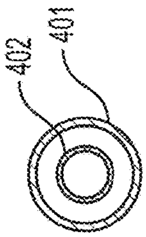
FIG. 7A shows a cross-sectional detail.

FIG. 7 shows a dry sprinkler, according to yet another embodiment, comprised of a casing tube 401 having a first end 403 and a second end 404. A sealing washer 405 seals an inlet orifice at the first end 403 of the casing tube 401, and a plug 411 seals an outlet orifice at the second end 404 of the casing tube 401.

A translating member 402 extends between the inlet and the outlet through the casing tube 401. Attached to the translating member 402 near the first end 403 is a yoke 406. In this embodiment, the yoke 406 is formed of a number (e.g., three or four) of struts secured to one end of translating member 402 and converging toward the first end 403, and also toward the axis of translating member 402, where they meet to form or support a tip that actually supports the sealing washer 405. In this embodiment, an opening 407 is provided in the yoke 406. In other embodiments, the yoke 406 is solid. Also attached to the translation member 402 near the second end 404 are a saddle 408 and an orifice adapter 409. In this embodiment, the saddle 408 has an opening 410. In other embodiments, the saddle 408 is solid.

The translating member 402 is a tube and is constructed to operatively release the sealing washer 405 in response to axial translation of the translating member 402 from a first position to a second position, thereby opening the inlet orifice and admitting water to the sprinkler. In the first position, the yoke 406 supports the sealing washer 405.

Also, in the first position, the translating member 402 is supported by the plug 411 by way of the orifice adapter 409. In other embodiments, an outlet orifice is machined into the frame of the sprinkler, without the use of an orifice adapter.

In this embodiment, when translating into the second position, the translating member 402 is constructed to axially translate toward the outlet when the plug 411 is released upon activation of the sprinkler. In the second position, the saddle 408 stops the motion of the translating member 402 while still allowing the flow to travel from the area between the translating member 402 and the casing tube 401 to the orifice in the distal (second) end of the sprinkler. Moreover, in a case in which there is an opening 407 in the yoke 406 and an opening 410 in the saddle 408, water is allowed to flow inside the translating member 402 from the opening 407 in the yoke 406 to the opening 410 in the saddle 408.

The diameters of the casing tube 401 and the translating member 402 can vary in size. For example, an inner diameter of the casing tube 401 can be greater than 38.1 mm (1.5 inches). In another example, a cross-sectional area of the casing tube 401 can be greater than 1161.29 sq. mm (1.8 sq. in.).

In this embodiment, the translating member 402 is a hollow tube and a difference between a cross-sectional area of the casing tube 401 and a cross-sectional area bounded by an outer perimeter of the translating member 402 is more than 30% of the cross-sectional area of the casing tube 401.

Figure 2:
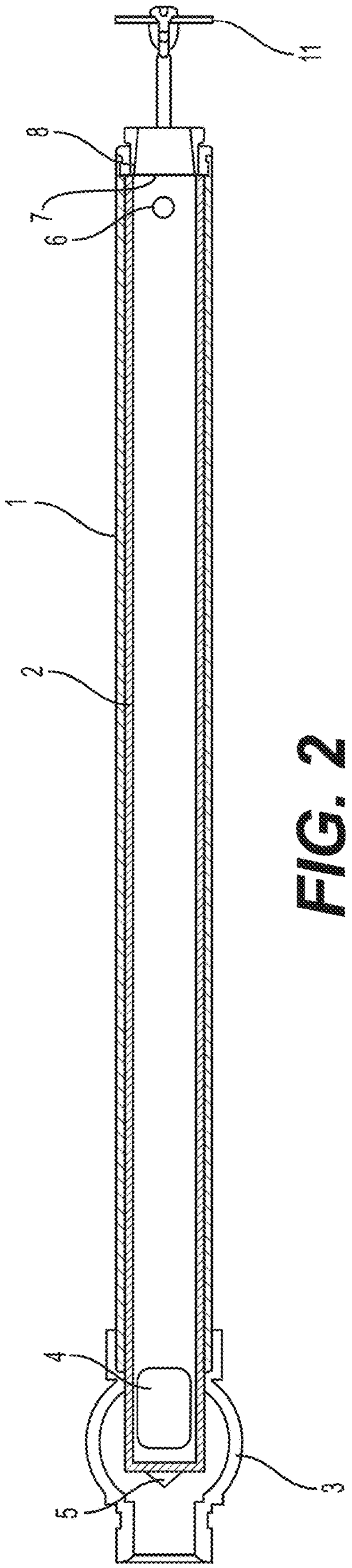
FIG. 2 PRIOR ART
FIG. 2 shows the conventional dry sprinkler of FIG. 1 in an actuated state.
Figure 2A:
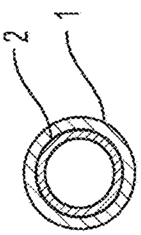
FIG. 2A PRIOR ART
FIG. 2A shows a cross-sectional detail.

By utilizing the area between the casing tube and the translating member for flow of water, flow restrictions can be minimized as compared with conventional sprinklers described above in connection with FIGS. 1 and 2, which funnels the flow through the inner tube. The hollow tube translating member 402 provides more efficient fluid flow through the sprinkler than the inner tube 2 translating member in FIGS. 1 and 2 by allowing more than 35% of the fluid flow through the sprinkler to pass between the translating member and the casing tube.

Similar to the embodiments described above in connection with FIGS. 3 to 6, in this embodiment, the dry sprinkler can have a nominal K-factor greater than 17 gpm/$(psi)^{1/2}$, can have a nominal K-factor equal to or greater than 22.4 gpm/$(psi)^{1/2}$, and can have a nominal K-factor as high as 33.6 gpm/$(psi)^{1/2}$ or greater.

Moreover, in this embodiment, the operating mechanism can include an extended coverage storage sprinkler head. The extended coverage sprinkler can have a maximum spacing exceeding 9.29 square meters (100 square feet) per sprinkler and up to 18.209 square meters (196 square feet) per sprinkler. For example, the dry sprinkler can be an extended coverage dry pendent storage sprinkler having a coverage area of greater than 10.22 square meters (110 square feet). In other examples, the coverage area is at least 13.38 square meters (144 square feet). And, in other examples, the coverage area is at least 18.209 square meters (196 square feet).

According to certain embodiments, the sprinkler is able to operate properly with the regular early suppression, fast response (ESFR) inlet size for a sprinkler with a K-factor of 14 gpm/$(psi)^{1/2}$ to 16.8 gpm/$(psi)^{1/2}$, with reduced pressure on the bottom parts of the sprinkler as compared with conventional structures. It has been found that certain embodiments can be implemented using a conventional sprinkler of the extended coverage type, and that the dry sprinkler of the invention in such an embodiment can be spaced at up to 14 feet×14 feet apart, instead of only 10 feet×10 feet apart.

According to certain embodiments, also, it is contemplated to make the sprinkler having a K-factor of 22.4 gpm/(psi)$^{1/2}$ or more, or having a K-factor of up to 25.2 gpm/(psi)$^{1/2}$ or 33.6 gpm/(psi)$^{1/2}$ or more. According to some embodiments, also the sprinkler head utilized is an extended coverage sprinkler head and the dry barrel sprinkler has a K-factor of 14.0 gpm/(psi)$^{1/2}$ or more, and even a K-factor of greater than 17 gpm/(psi)$^{1/2}$, or a K-factor of up to 25.2 gpm/(psi)$^{1/2}$ or 33.6 gpm/(psi)$^{1/2}$ or more.

According to some embodiments, the diameter of the outer tube is greater than 1.25 inches, and may be at least 1.5 inches. In certain embodiments, also, the diameter of the translating member (which may or may not be structured as an inner tube) is 80% or less of that of the outer tube. In some embodiments, more particularly, the translating member has a cross-sectional area that occupies at least 2% of, and not more than 65% of, the internal cross-sectional area of the casing tube, and the inlet orifice and the outlet orifice may communicate with the volume between the casing tube and the translating member either in addition to or instead of with the interior of the translating member, when the translating member is a tube. The relative cross-sectional area of 2% is based on a 6.35 mm (0.25 in.) diameter rod in a 40.64 mm (1.6 in.) inner diameter casing tube. The relative cross-sectional area of 65% is based on a dry sprinkler, which has a 22.098 mm (0.87 in.) diameter inner tube and a 27.178 mm (1.07 in.) inner diameter casing tube, for an area ratio of 66%. The percentage of the area occupied is the percentage of the diameter occupied squared.

In yet other embodiments, the casing tube has an average outer diameter of at least 38.1 mm (1.5 in.) or can have an average outer diameter of 38.1 to 63.5 mm (1.5 to 2.5 in.). Also, in some embodiments, the casing tube has an average inner diameter that is at least 5.08 mm (0.2 in.) greater than an average outer diameter of the translating member.

One application for the dry sprinklers described herein, in connection with FIGS. 3 to 7, is for large storage freezers, such as distribution centers that supply grocery stores. These types of buildings are typically constructed in two ways: (1) the exterior walls and the roof of the building are heavily insulated and the entire interior of the building is maintained below freezing; or (2) a large freezer unit is constructed within a conventionally constructed, conditioned, and insulated building. In the second type, the interior of the building outside of the freezer is maintained above freezing. The dry sprinklers disclosed herein can work with buildings of the second type, in which the sprinkler piping is located within the building, but outside of the freezer. This allows the sprinkler piping to be filled with water, because the pipe is located outside of the freezer in a part of the building where the conditions are maintained above freezing. The dry pendent sprinkler has the water seal at the end of the sprinkler that connects to the sprinkler pipe, so that water is not allowed into the sprinkler until activation. The dry pendent sprinkler penetrates through the top of the freezer unit into the freezing environment. This allows the freezer to be protected with a wet-pipe sprinkler system instead of a dry-pipe sprinkler system. Since the dry sprinklers disclosed herein can provide a maximum spacing exceeding 9.29 square meters (100 square feet) per sprinkler, an advantageous effect is provided in which fewer sprinklers are required for a given coverage area, and, therefore, fewer penetrations through the top of the freezer unit are required. Having fewer penetrations in the freezer unit allows the freezer unit to perform more efficiently.

Reference can be made to National Fire Protection Association (NFPA) 13, Standard for the Installation of Sprinkler Systems and FM Data Sheet 8-9 (FM Global Property Loss Prevention Data Sheets 8-9) for definitions of terms of art used in this disclosure. Of course, the embodiments described herein are not limited to the definitions provided in these documents.

While the present disclosure has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

I claim:

1. An arrangement of extended coverage dry pendent storage sprinklers for a storage freezer, the storage freezer having a top and a freezing environment within the storage freezer, the arrangement of dry pendent storage sprinklers comprising:

a plurality of dry pendent storage sprinklers, each dry pendent storage sprinkler penetrating through the top of the storage freezer into the freezing environment and each dry pendent storage sprinkler comprising:

(A) a casing tube having an inlet end at a first end, the inlet end defining an inlet orifice, and an outlet end at a second end, the casing tube defining a liquid passage and a sprinkler axis from the inlet end to the outlet end;

(B) an inlet seal assembly configured to operatively seal the inlet orifice when the sprinkler is in a non-actuated state;

(C) a sprinkler head connected to the outlet end of the casing tube, the sprinkler head comprising an outlet orifice that faces a deflector to deliver liquid to the deflector upon actuation of the sprinkler;

(D) a translating member extending from the inlet end to the outlet end through the casing tube, the translating member including a proximal pin at the inlet end of the casing tube and a distal pin at the outlet end of the casing tube, and the translating member (i) supporting the inlet seal assembly by the proximal pin to seal the inlet orifice, and (ii) being configured to axially translate from a first position, in which the translating member retains the inlet seal assembly in a sealed state, to a second position, in which the translating member releases the inlet seal assembly upon actuation of the dry pendent storage sprinkler;

(E) an inlet support adjacent to the inlet orifice at the inlet end of the casing tube, the inlet support extending from the translating member to the casing tube to support the translating member when the sprinkler is in the non-actuated state, wherein the inlet support is a yoke formed by several rods, each rod having one end secured to the translating member and an opposite end projecting at an outward angle away from the translating member towards the casing tube; and (F) an outlet support adjacent to the outlet orifice along an axis that is perpendicular to a longitudinal axis of the translating member and supporting the translating member when the sprinkler is in the non-actuated state, wherein a difference between an internal cross-sectional area of the casing tube and a cross-sectional area bounded by an outer perimeter of the translating member is more than 30% of the internal cross-sectional area of the casing tube, wherein the translating member (i) has a constant outer diameter between the inlet support and the outlet support, (ii) has a cross-sectional area that occupies at least 2% of, and not more than 65% of, the internal cross-sectional area of the casing tube, (iii) is supported by the inlet support and the outlet support in the first position, and (iv) is arranged to axially translate toward the outlet end upon being released by the outlet support upon actuation of the dry pendent storage sprinkler, and wherein each dry pendent storage sprinkler has a nominal K-factor equal to or greater than 14 $gpm/(psi)^{1/2}$ and a coverage area of greater than 10.22 square meters, with a maximum spacing in the arrangement exceeding 9.29 square meters per sprinkler.

2. The arrangement of extended coverage dry pendent storage sprinklers according to claim 1, wherein the outlet support of each sprinkler is a saddle attached to the translating member.

3. The arrangement of extended coverage dry pendent storage sprinklers according to claim 1, wherein the nominal K-factor of each sprinkler is equal to or greater than 22.4 $gpm/(psi)^{1/2}$.

4. The arrangement of extended coverage dry pendent storage sprinklers according to claim 1, wherein the coverage area of each sprinkler is at least 13.38 square meters.

5. The arrangement of extended coverage dry pendent storage sprinklers according to claim 1, wherein the coverage area of each sprinkler is up to 18.209 square meters.

6. The arrangement of extended coverage dry pendent storage sprinklers according to claim 1, wherein the translating member of each sprinkler axially translates toward the outlet end upon being released by the outlet support for actuation of the sprinkler such that the liquid is caused to flow around the translating member.

7. The arrangement of extended coverage dry pendent storage sprinklers according to claim 1, wherein the translating member is one of a tube and a solid rod.

8. The arrangement of extended coverage dry pendent storage sprinklers according to claim 1, wherein each dry pendent storage sprinkler has a nominal K-factor equal to or greater than 16.8 $gpm/(psi)^{1/2}$.

9. The arrangement of extended coverage dry pendent storage sprinklers according to claim 1, wherein the sprinkler head comprises (a) the deflector and (b) a frame supporting the deflector, and having a connector machined into the frame.

10. The arrangement of extended coverage dry pendent storage sprinklers according to claim 9, wherein the connector secures the sprinkler head to the outlet end of the casing tube.

11. The arrangement of extended coverage dry pendent storage sprinklers according to claim 1, wherein the inlet orifice and the outlet orifice of each sprinkler communicate with a volume interior of the casing tube and an exterior of the translating member.

12. The arrangement of extended coverage dry pendent storage sprinklers according to claim 11, wherein the casing tube of each sprinkler has an average outer diameter of at least 38.1 mm.

13. The arrangement of extended coverage dry pendent storage sprinklers according to claim 11, wherein the casing tube of each sprinkler has an average outer diameter of 38.1 to 63.5 mm.

14. The arrangement of extended coverage dry pendent storage sprinklers according to claim 11, wherein the casing tube of each sprinkler has an average inner diameter that is at least 5.08 mm greater than an average outer diameter of the translating member.

15. The arrangement of extended coverage dry pendent storage sprinklers according to claim 1, further comprising the deflector and a frame supporting the deflector, the frame having a connector machined into the frame, the connector (i) securing the sprinkler head to the outlet end of the casing tube, and (ii) defining the outlet orifice that faces the deflector.

16. The arrangement of extended coverage dry pendent storage sprinklers according to claim 1, wherein each dry pendent storage sprinkler has a nominal K-factor equal to or greater than 14 and equal to or less than 16.8 $gpm/(psi)^{1/2}$.

17. The arrangement of extended coverage dry pendent storage sprinklers according to claim 1, wherein each dry pendent storage sprinkler has a nominal K-factor equal to or greater than 33.6 $gpm/(psi)^{1/2}$.

18. The arrangement of extended coverage dry pendent storage sprinklers according to claim 1, wherein the translating member has a cross section in the shape of one of a cross, a triangle, or a polygon.

* * * * *